United States Patent

Martin

[15] 3,638,520

[45] Feb. 1, 1972

[54] MACHINE TOOL

[72] Inventor: Jack D. Martin, 5157 Osceola Drive, Dayton, Ohio 45427

[22] Filed: Sept. 11, 1969

[21] Appl. No.: 857,001

[52] U.S. Cl. ......................................... 82/24, 82/19, 82/35
[51] Int. Cl. ........................................................ B23b 21/00
[58] Field of Search .................. 82/24, 19, 35, 36, 43; 29/57; 77/73

[56] References Cited

UNITED STATES PATENTS

| | | | |
|---|---|---|---|
| 1,820,056 | 8/1931 | Drowns | 82/35 |
| 1,976,459 | 10/1934 | Quichon | 82/19 X |
| 2,645,000 | 7/1953 | Finch | 82/35 X |
| 3,109,336 | 11/1963 | Rozum | 82/36 A |

FOREIGN PATENTS OR APPLICATIONS

| | | | |
|---|---|---|---|
| 666,894 | 2/1952 | Great Britain | 82/4 C |

*Primary Examiner*—Leonidas Vlachos
*Attorney*—Norman R. Wissinger

[57] ABSTRACT

An eccentricity-correcting machine tool comprising a reference surface-following bearing member and a cutter in fixed spacial relationship to said bearing which, in response to the influence of the bearing, will cut in a predetermined pattern in constant relationship to the reference surface regardless of the eccentric or other erratic mounting or movement of the total workpiece of which the reference surface is a part.

3 Claims, 9 Drawing Figures

PATENTED FEB 1 1972 3,638,520

INVENTOR
JACK D. MARTIN
ATTORNEY

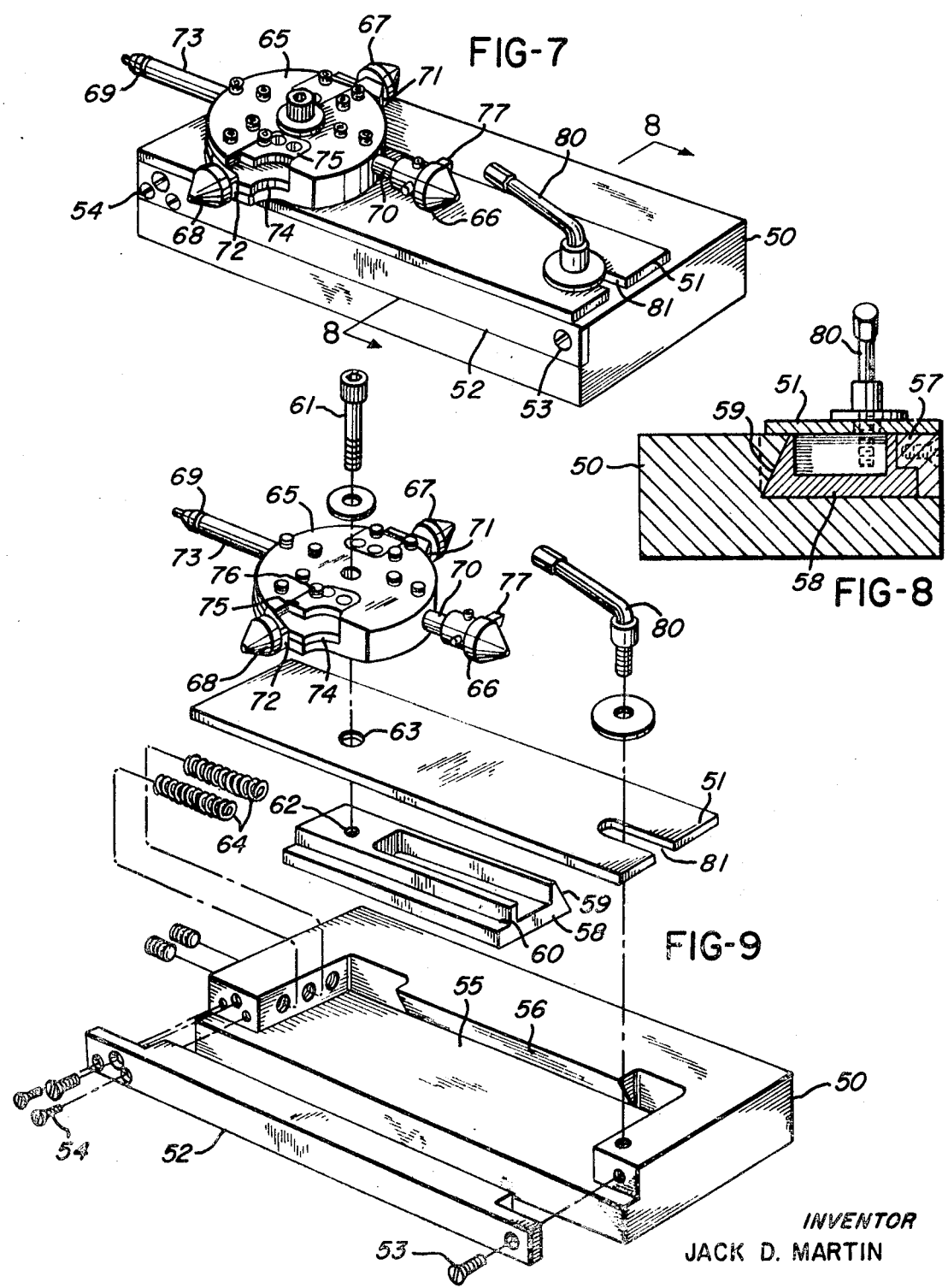

MACHINE TOOL

BACKGROUND OF THE INVENTION

1. Field of the Invention

The present invention relates to the general art of machining and particularly to the art of tools for cutting metal stock or workpieces that are rotatably reciprocally or otherwise movably mounted in a lathe or a related machine and are contacted by such tools. Still more specifically, the invention relates to the art of radiusing, chamfering or counterboring a hollow workpiece characterized by a reference surface such as a cylindrical bore therethrough in, around or upon which it is desired to form a cut or machined surface in symmetrical or some other desired constant relationship thereto. For example, the present invention relates to the art of radiusing or chamfering the intersection of the central passage of a hollow cylindrical workpiece with each of the end faces of the workpiece so that the radiused or chamfered surfaces will be concentric with the bore, regardless of the axial coincidence thereof with the axis of rotation of the workpiece in a lathe.

2. Description of the Prior Art

In the prior art of machining of this type, particularly in the operation of lathes, it has customarily been desired to place a workpiece between the spindles or within holding chucks on the lathe to rotate the same and then to bring cutting tools mounted upon or otherwise held against a fixed bed of the lathe in to contact with the rotating workpiece to cut, shave, or scrape material therefrom in a uniform pattern concentric with the axis of rotation of the workpiece. Quite often, perfect symmetry of the piece being thus formed is a primary objective; and, because the axis of rotation of the workpiece is fixed by its mounting in the chucks or spindles of the lathe, such symmetry is usually automatically obtained. On the other hand, where, for a variety of reasons, it is necessary at some stage during the completion of the workpiece to remove it from the lathe and then to replace it in the same or another lathe or machine for further forming, it is quite difficult to cause the workpiece to rotate about the same axis as it was rotating in the earlier operation; and symmetry in such cases is therefore difficult if not impossible, to achieve.

In many operations for example, a hollow workpiece having a bore or other passage through and opening upon the opposite end faces thereof is mounted upon a lathe for the purpose of machining one end face of the piece, particularly in the area where it is intersected by the bore. Where it is desired that the faces at both ends of the piece have the same finish, it is then necessary to remove the piece from the lathe and to invert it to present the second end face to the cutting or machining. Upon such inversion, it is most difficult to again position the piece in the lathe so that the axis of its rotation will be identical with that of its rotation during the cutting of the first face; and the resultant contour of the second face will not be symmetrical with that of the first. Stated otherwise, the inversion of the workpiece in the lathe invariably causes a "rideout" or eccentric movement of its second end face. Then, when a fixedly mounted tool is brought into cutting contact with the second end face, the eccentricity of the movement of the surface being cut relative to the opening about which it is cut and relative to the surface cut upon the first face of the workpiece causes the cut surface itself to be eccentric.

In attempts to solve these problems, the prior art has resorted to a variety of gauging and locating devices to insure accurate realignment of the workpiece during a sequence of two or more removals and reinstallations thereof into a lathe so that a constant rotational axis may be maintained and symmetrical cutting achieved. All of such devices however have been extremely difficult and time consuming to employ; and their cost and the degree of skill required to use them have been directly proportional to the degree of accuracy they have been able consistently to achieve. Consequently, such devices as have been considered reasonable from the standpoint of difficulty of usage have generally been discarded because of the lack of accuracy achievable; and those that have been capable of achieving a reasonable degree of consistency in consecutively reestablishing the same rotational axis, have been so difficult to obtain and employ that their use has been nominal. On the other hand, regardless of cost, degree of skill required and time consumed in utilizing the devices of the prior art, none of those heretofore known have been able reliably to insure a sufficient identity of rotation to provide reasonable assurance that a surface cut upon the second end of the workpiece would be in any symmetry therewith or with a surface previously cut upon the first end face thereof.

It is accordingly an object of this invention to provide a cutting tool capable of forming a surface in a fixed predetermined relationship to a reference surface on a workpiece, regardless of irregularities in the movement of the workpiece, regardless of irregularities in the movement of the workpiece relative to the tool.

A more specific object of the present invention is to provide such a tool which can be inexpensively manufactured and quickly and easily employed to achieve the desired results.

A more specific object of the invention is to provide such a tool for providing a radius, chamfer or counterbore about the intersection or would-be intersection of a bore through a workpiece at both ends thereof wherein said radiused, chamfered or counterbored surfaces will be symmetrical and concentric with each other and with the bore.

SUMMARY OF THE INVENTION

To achieve these and other objects and advantages which will appear from the within disclosure, the present invention provides a tool assembly comprising a reference surface-following bearing and a cutting tool in fixed spacial relationship thereto whereby the location of the cutting tool and the surface being cut thereby will be determined by the shape and location of the reference surface, regardless of any eccentricity or other irregularity in the movement of the workpiece or in its changing relationship to the bed or toolholder or the lathe in which it is moving. The reference surface-following bearing is designed to move easily over the reference surface as by a rolling or sliding motion and, in a preferred case, may be in the form of a sleeve or cylinder rotatably mounted upon a shaft allowing it to extend, for example, into the bore of a workpiece and to bear against the reference surface and to rotate in response to relative movement between it and such surface. The mounting of the cutting tool in fixed spacial relationship to the bearing may then be achieved simply by mounting the tool on the shaft or on the bearing base to which the shaft is affixed; and the cutter should of course be so positioned that, while the bearing is contacting the reference surface, the cutter will be in contact with the workpiece at the location of the desired cutting operation thereon.

To insure that the bearing will in fact be in operable contact with the reference surface, the bearing, the shaft or the bearing base to which it or they, along with the cutter, are attached is provided with forcing means such as a compression spring which will at all times force the bearing against the reference surface but will yield under the influence of eccentric or erratic motion thereby compensating for any departures from symmetry resulting from the manner in which the workpiece is mounted. In the case of a compression spring, it is of course necessary that the end of the spring opposite that in contact with the bearing member or bearing member assembly bear against a fixed surface such as may be provided by a conventional lathe toolholder or some other surface that is fixedly mounted relative to the lathe or other cutting machine. The necessary integration of all of these components may be achieved by slidably mounting the follower bearing or the follower bearing assembly upon a toolholding base which may be fixedly mounted upon the cutting machine at one or more preselected locations thereon. To achieve the desired results of this invention, it is then necessary only that the mounting base be so associated with the cutting machine, relative to the location thereon of the workpiece, that, when the reference surface follower bearing is brought in touch with the workpiece, the compression spring or other urging means will be actuated, as for example by a nominal compression of the spring, to cause the bearing to press constantly against the reference surface. Then, upon relative movement between the reference surface and the follower bearing, the cutter will be in the desired, preset relationship to the workpiece and will preserve a constant spacial relationship with the reference surface as the follower bearing continues to move against and along it, while it or its assembly slides back and forth in the mounting base in response to any eccentricities or other irregular movements of the workpiece relative to the cutting machine or the mounting base which is affixed thereto.

DESCRIPTION OF THE DRAWINGS

In the drawings:

FIG. 7 is a perspective view of a modification of the machine tool according to the present invention.

FIG. 8 is an elevational view in partial cross section taken on the line 8—8 of FIG. 7.

FIG. 9 is an exploded perspective view of the modification of the machine tool of this invention illustrated in FIG. 7.

Referring now to FIGS. 1 through 6, one preferred embodiment of the machine tool according to the present invention, designated generally by the reference number 10 is shown to be mounted upon a lathe 11 which comprises a chuck 12, with a series of adjustable fingers 13. The chuck 12, in the manner well known to the art of lathe machining, is adapted for holding and rotating a piece of stock or a workpiece 14 to be machined by the lathe. In the manner of conventional lathes, that of the illustration also comprises a bed 15 upon which is mounted a conventional toolholder 16 which itself comprises a base 17 and a toolholding carriage 18. As is customary and well known to the art, the toolholder thus constituted is so designed that it may first be adjusted longitudinally of the lathe by sliding it along a shaft (not shown) passing through the opening 19 in the projecting lug 20 and may then be held in the desired longitudinal position by clamping means such as a setscrew (not shown) passing through the wall of the lug 20 and bearing against the shaft within the passage 19. With the toolholder and the tool held thereby thus fixed longitudinally of the lathe, the toolholder itself may then be moved transversely of the lathe by operation of a gear shaft 21 rotatable within the base 17 and acting against companion gearing in the carriage 18. It should be noted that, while in the following disclosure, reference will be made to the fact that the toolholder and the various components comprising it are in fixed relationship to the lathe, this fixed relationship is selectively interruptable and adjustable as is necessary in accommodating a variety of different workpieces and in performing a variety of different machining operations thereon.

Referring now to FIGS. 2 through 6 and particularly the latter, one preferred embodiment of a machine tool according to the present invention is shown to comprise a housing consisting of the mounting base 22, the cover plate 23 and the stopping plate 24, the latter two being removably associated with the former by threaded fastening means such as the screws 25 and 26. Note further that the base 22 is characterized by the keyway or keyed channel 27 extending longitudinally thereof through a substantial portion of its length. In combination with this housing, the embodiment comprises the follower assembly consisting of the sliding block 28 transversely of and at one end of which is mounted the headed shaft 29 (which may be in the form of a machine bolt threadably engaging a companion opening in the sliding block 28), the cutting member 30, the cutter holding clamp 31 (attached to the sliding block 28 by the screws 32 and, along with the setscrew 33, firmly holding the cutter 30 within the sliding block 28), and the reference surface-following bearing 34 which is mounted for free rotation about the shaft 29. The free rotation may be accomplished by ball, roller or other well-known means (not shown).

Figure 1:
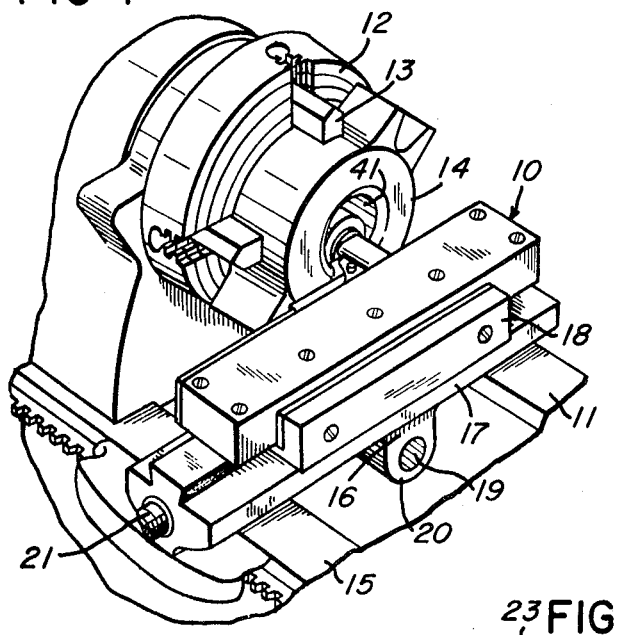
FIG. 1 is a fragmentary perspective view showing a machine tool according to the present invention mounted upon a lathe and in cutting contact with a workpiece being held by and rotated in the chuck thereof.

The channel 27 of the base 22 is characterized by the longitudinally extending groove 35, and the sliding block 28 is characterized by the longitudinally extending groove 36 separating the downwardly projecting lugs 37 and 38 thereon. The lug 37 is adapted to fit for sliding movement in the groove 35 and lug 38 overhangs the edge of the base 22 to provide for an to accommodate the free sliding movement of the sliding block 28 within the base 22 when the follower assembly is held within the housing by the affixation of the cover plate 23 to the base 22. It should also be noted that the sliding movement of the follower assembly thus positioned is restricted at one end by the abutment of one end of the sliding block 28 against the companion surface of the stopping plate 24 and at the other end by the action of the compression spring 39 which is positioned within the channel 27 with one end of the spring abutting the end surface 40 of the channel and the other end of the spring abutting the opposite end of the mounting block 28.

Figure 2:
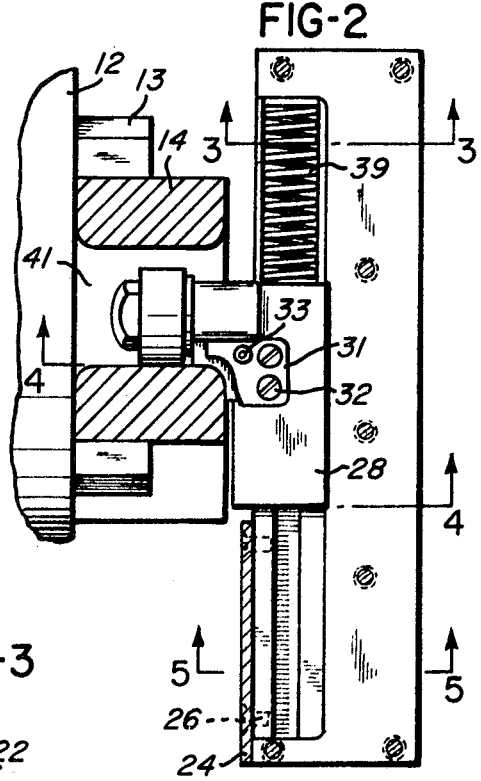
FIG. 2 is a plan view in partial cross section of the cutting tool illustrated in FIG. 1 with the top cover plate thereof removed.
Figure 3:
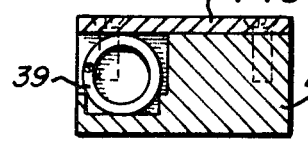
FIG. 3 is an elevational view in partial cross section taken on the line 3—3 of FIG. 2.
Figure 4:
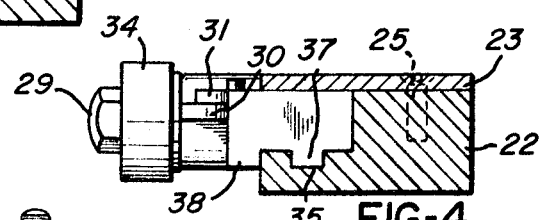
FIG. 4 is an elevational view in partial cross section taken on the line 4—4 of FIG. 2.
Figure 5:
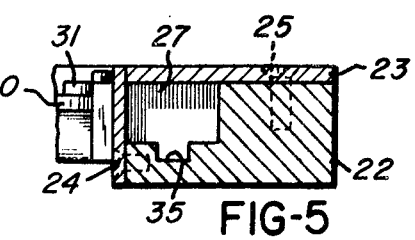
FIG. 5 is an elevational view in partial cross section taken on the line 5—5 of FIG. 2.
Figure 6:
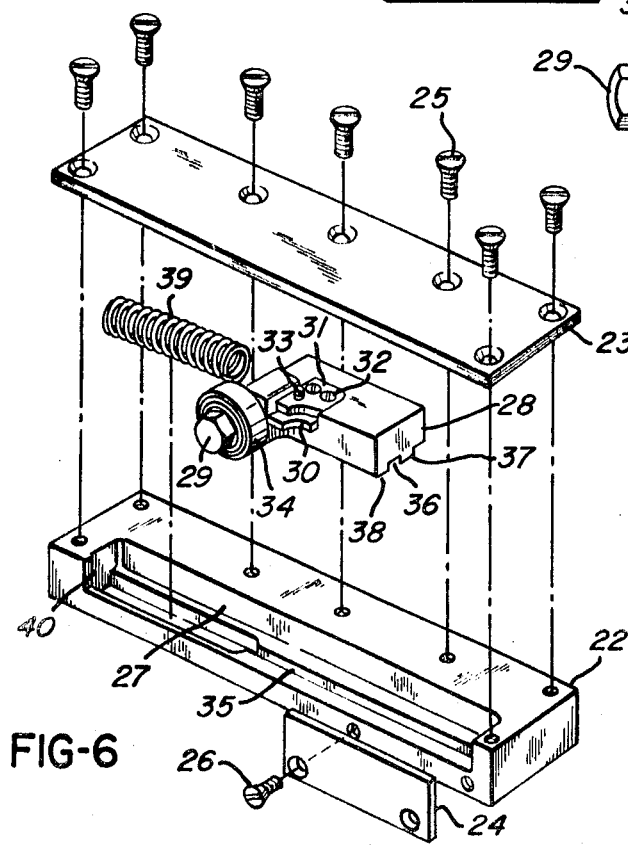
FIG. 6 is an exploded perspective view of the machine tool illustrated in FIGS. 1 through 5.

Referring back to FIGS. 1 and 2 and the manner of operation of the machine, when it is desired to made a radius or chamfer cut about the intersection of the bore 41 with the end face 42 of the workpiece so that the cut will be both at right angles to and concentric with the axis of the bore, the workpiece may be mounted in the chuck as shown in FIG. 1. The toolholder may then be adjusted, both longitudinally and transversely of the lathe and of the workpiece held therein so that the cutter 30 will be in contact with the edge or surface to be machined and the reference surface (in this case the inner cylindrical surface of the bore 41) will not only be in contact with the reference surface-follower bearing 34 but also will exert a force against the same to the extent that such force, transmitted through the shaft 29 will cause the sliding block 28 to be forced against and slightly to compress the spring 39 as a result of which the influence of the spring upon the counter-pressure of the bearing 34 acting against the reference surface will be relatively constant. As a result of this assemblage, it can be seen that, once the lathe is started by causing the chuck 12 and the workpiece 14 to rotate, cutting movement, sufficient to cause the cutter 30 to remove metal from the workpiece, will take place and that the cutting will always be concentric with and at right angles to the axis of the bore 41 for the reason that the follower bearing 34 will be constantly urged against the inner surface of the bore, regardless of whether the bore itself is concentrically and perpendicularly mounted and rotated within the chuck.

Referring now to FIGS. 7, 8 and 9, a modified embodiment of the present invention is a toolholder comprising a housing consisting of the base 50, the cover plate 51 and the edge plate 52. When the edge plate 52 is affixed to the base 50 by the screws 53 and 54, it will be observed, particularly from reference to FIG. 8, that the housing defines a channel 55, one of the longitudinal edges 56 of which is inwardly inclined and the other edge of which is characterized by the projecting lug 57. Slidably positioned within such channel is the sliding block 58 which is characterized by the upwardly inclined edge surface 59 to bear against the similarly disposed surface 56 of the channel and the angular groove 60 to embrace the inner surface and bottom of the lug 57 along the guiding bar 52 to insure free sliding movement of the sliding block 58 within the channel 55.

Because the sliding block 58 is thus held within the channel by the interaction of the base 50 and the edge plate 52, the cover plate 51 is not required for this purpose, and it is therefore not necessary that it be mounted to the base 50 or other housing component. Rather, the other components of the reference surface follower bearing assembly are mounted to the sliding block through the cover plate 51 by the screw 61 which threadably engages the threaded bore 62 in the sliding block, the screw 61 passing through the opening 63 in the cover plate 51. Thus, not only is the sliding block 58 slidable within the groove 55 but also the cover plate 51 is slidable in response to such motion influenced at one extreme by the abutment of the one end face of the sliding block 58 against the companion surface at the end of the groove 55 and at the other end by the abutment of the opposite end of the sliding block 58 against one or more compression springs 64.

The cutter and follower assembly of this modification is shown to be in the form of a turret 65, radially projecting from which may be a variety of follower bearings such as 66, 67 and 68 in the form of cones superimposed upon cylinders, the cylindrical portion to provide the actual surface-following bearing and the conical forwardly extending portion to enhance the ease of insertion of the follower into the reference surface area, particularly where the reference surface is hollow or cylindrical in nature. The followers are affixed to the turret 65 by the shafts such as 70, 71, and 72 respectively, all of which are threadably or otherwise fixedly associated with the turret at one end and carry the follower for free rotation at the other. The shaft 63 is similarly affixed to and projects from the turret 65 and is itself designed to receive yet another follower unit such as the cylinder-cone combination of the followers 66, 67 and 68. Small ball bearings (not shown) may be positioned in the groove 69 about the end of the shaft to engage the inner shell of the hollow follower unit and to enhance its free rotation about the shaft. In fixed spacial relationship to each of the following bearings may be a cutter assembly such as that associated with the follower 68 consisting of the cutting member or blade 74 inself and the cutter holding plate 75 threadably affixed to the turret on the one hand and engaging the cutting member 74 by the threadable setscrew 76 passing therethrough on the other. The cutter however need not necessarily be associated with the turret and, as in the case of the cutter 77 associated with the follower 66, may be mounted to the same shaft 70 upon the end of which the follower 66 is rotatably mounted. In either case, it will be seen that the spacial relationship between the cutter and the follower surface remains constant.

From the assemblage of parts described in connection with this modification, it can be seen that, as in the case of the embodiment of FIGS. 1 through 6, the sliding motion of the reference surface-following assembly may be accommodated and the fixed relationship between the follower and the cutter may be maintained because of the fixed spacial relationship between the cutters and the follower bearings. Thus, the tool of this modification may be mounted upon a lathe in the same manner as that described in connection with the embodiment illustrated in FIGS. 1 and 2 with the added feature however that, a variety of different cutting blades and follower assemblies may be provided on a single turret and selected for a particular operation simply by loosening the screw 61 and rotating the turret until the desired follower and cutter are projecting from the edge of the tool. To increase the versatility and the ease of using this modification, the turret itself may be provided with one or more index marks (not shown) and the top of the cover plate 51 may be provided with a series of degree markings on a scale so that proper alignment of the index on the turret with the desired degree on the scale will position any one of the follower-cutter assemblies in the precisely desired predetermined relationship relative to the entire tool assembly and to the workpiece upon which is to perform a machining operation.

A further modification embodied in the tool illustrated in FIGS. 7 through 9 comprises the locking assembly consisting of the threaded toggle handle 80 which threadably engages an opening in the base 50 and passes through the elongated slot 81 in the edge of the cover plate 51 whereby, if the toggle is rotated and tightened into the opening, the plate 51 and the cutter and following assembly affixed to the plate will be held against any motion whatsoever. When so locked, the tool may be used as a conventional cutting tool; i.e., without any sliding or following motion, to cut original surfaces rather than to form a secondary surface in a particular relationship to another.

While the present invention has been described in considerable detail in connection with two specifically preferred embodiments thereof, the foregoing particularization has been for the purpose of description only and does not limit the scope of the invention as it is defined in the subjoined claims.

I claim:

1. A machine tool for forming a secondary machined surface upon and in a predetermined relationship to a previously formed primary surface comprising a base to be mounted upon the cutting machine in fixed relationship thereto and to a workpiece held thereby, a surface follower assembly comprising a rotatably mounted turret block, radially from which extend at least two radially spaced surface-following bearing members each of which is in fixed spacial relationship to one or more cutters fixedly mounted upon said turret whereby said turret may be rotated selectively to cause one of said follower-bearing members to project beyond the base of said tool for regulating contact with said primary surface, said assembly being slidably mounted upon said base, and yieldable means for constantly urging said turret member and the projecting one of said follower bearings and cutters against said primary surface while said cutter is in contact with the area of said primary surface upon which said secondary surface is to be formed and relative movement between said cutter and said secondary surface to achieve said cutting takes place.

2. A tool according to claim 1 wherein said yieldable means comprise a compression spring acting against said surface follower assembly.

3. A tool according to claim 1 wherein said surface follower bearing member is in the form of a cone superimposed upon a cylinder.

* * * * *